Dec. 17, 1929.   N. A. CHRISTENSEN   1,739,782
VEHICLE WHEEL BRAKE MECHANISM
Filed June 18, 1924
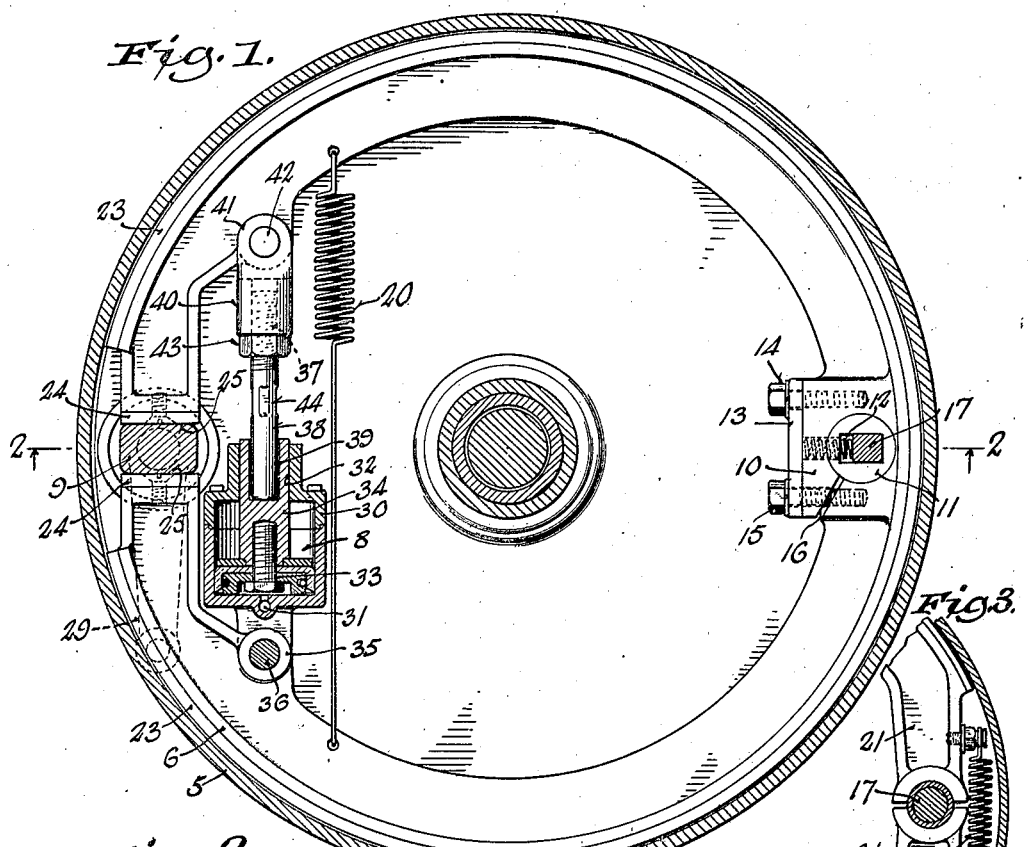
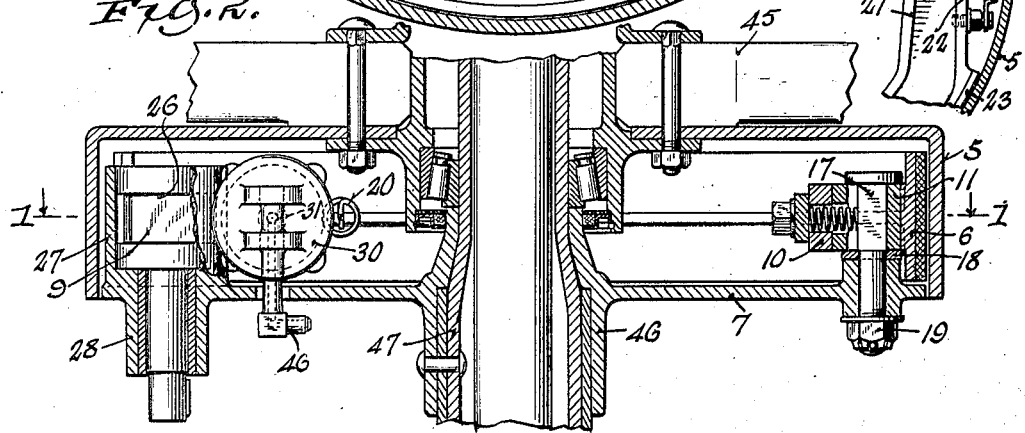
INVENTOR.
NIELS A. CHRISTENSEN
BY
ATTORNEYS.

Patented Dec. 17, 1929

1,739,782

UNITED STATES PATENT OFFICE

NIELS A. CHRISTENSEN, OF MILWAUKEE, WISCONSIN

VEHICLE WHEEL BRAKE MECHANISM

Application filed June 18, 1924. Serial No. 720,781.

The invention relates to brake mechanism for automotive vehicles and trailers for such vehicles, that may be used either with the front or rear wheels of the vehicle.

One object of the invention is to provide a brake mechanism of the internal expanding type in which the brake member may be operated either by fluid pressure or manually, or both, to engage the brake-drum with which the brake member is associated. When the device is used in connection with the front wheel, it will be understood that the manually-operated part of the construction can be operated by any of the well-known means now used for operating front-wheel mechanical brakes.

A further object of the invention is to provide a brake in which the inoperative position of the manually operable member determines the release position of the brake.

The invention further consists in the several features hereinafter set forth and more particularly defined by claims at the conclusion hereof.

In the drawings: Fig. 1 is a sectional view of brake mechanism embodying the invention, taken on the line 1—1 of Fig. 2;

Fig. 2 is a detail section taken on the line 2—2 of Fig. 1, looking in the direction of the arrows, with the brake cylinder shown in full.

Fig. 3 is a detail view of a brake-shoe construction.

In the drawings the numeral 5 designates a brake-drum, 6 a brake member for engaging said drum, 7 the support for the brake member, 8 a fluid-pressure motor operatively connected to said brake member to move it into braking engagement with the drum, and 9 a spreader member also connected with said brake member to move its parts into braking engagement with the drum.

In Figs. 1 and 2 I have shown the brake member 6 as made of a split band of metal, such as cast iron, having a split intermediate anchor-pin-bearing portion 10 having a bore in which a bushing 11 is mounted. together with a spring 12, and the split parts are clamped to the bushing by a bridge-piece 13 and screws 14 and 15 passing through said piece 13 into the band, the screw 15 passing through the slot 16 of the portion 10. The bushing 11 slidably fits on the squared portion of the anchor pin 17 mounted on the support 7, and is positioned between the head of said pin and the adjacent support 7 or the washer 18 adjacent said support by the nut 19. The spring 12 is interposed between the pin 17 and a plug in the bridge-piece and normally acts to hold the bushing in such position relative to the pin as to provide clearance between the intermediate portion of the band and the brake-drum. Thus, the mid portion of the band is secured to the support so that the free parts of the band may be moved outwardly into engagement with the drum against the action of a spring 20 connected to the free ends of the band, which normally acts to move said ends to a release position. While said member 6 has been described as a band, because both sides form a part of the band, these sides act like like a pair of brake-shoes upon the drum and instead of making them integral they may be made separate and pivoted upon the anchor pin 17 and its bushing, as shown in Fig. 3, where each shoe 21 has a semi-cylindrical bearing held against the pin 17 by a spring 22. Inasmuch as the band shown in Figs. 1 and 2, and the shoes shown in Fig. 3, are broadly functional equivalents, I desire it to be understood that the term "brake member having relatively movable portions" refers either to the band or the shoe form above described. In either instance the brake member is preferably provided with a suitable brake lining 23.

The ends of the band or shoes have hardened steel plates 24 secured thereto and bearing upon the flat surfaces 25 of the cam member or expander 9, and as these flat surfaces are milled square shoulders 26 are formed against which the shoes abut to prevent their lateral movement. The expander 9 works in a cylindrical boss 27 formed on the support 7, which boss is slotted to receive the ends of the brake member, and the shank of said expander extends through a bearing boss 28 on said support and is connected to a lever 29 adapted to be operated in any well-known manner, by the operator of the vehicle, to swing the expander and thereby spread the band or move the shoes apart to apply the brake to the drum.

The fluid-pressure-operated motor 8, which applies pressure to the brake, preferably consists of a two-part brake-cylinder 30 whose parts are bolted or otherwise suitably secured together. This cylinder has an air port 31 at one end for the inlet and exhaust of compressed air, and a piston rod guide bore 32 at its other end. A suitably packed piston 33 works in the cylinder 30 and has its rod 34 bolted or otherwise suitably secured to its head and working in the bore 32.

The head end of the cylinder 30 has ears 35 formed integral therewith and straddling the flange of the band or one of the shoes adjacent one of the ends of the brake member and operatively secured thereto by a pin 36. The piston rod 34 has a part 37 formed separate from the part that works in the cylinder in the form of a rod 38 seated in a bore 39 and in threaded engagement with a head 40 having eyed end portions 41 straddling the flange of the band or the other of the shoes adjacent one of the ends of the brake member and operatively secured thereto by a pin 42. A locknut 43 on the rod 38 secures it in adjusted position relative to the head 40 and said rod may have flattened parts 44 to facilitate the use of a wrench in making the adjustment. The adjustment for clearance of the brake member is, however, taken care of by the expander or cam member which acts as a stop to determine the release position of the ends of the band or the shoes forming the brake member.

With this construction oscillation of the expander or cam member 9 moves the brake portions of the band, or the shoes forming the brake member, into engagement with the drum 6 to apply braking pressure to the wheel 45, which may be bolted or otherwise secured to the drum, during which operation the piston and the cylinder of the fluid-pressure-operated motor are free to move relative to each other, and introduction of compressed air into the brake-cylinder through a pipe 46 connected with the port 31 causes the piston and brake-cylinder to move relative to each other to apply the brake member to the drum 5. Upon the return of the expander or cam member to inoperative position, or upon the release of air from the brake-cylinder, the parts of the brake member are moved to release position free of the drum by the spring 20.

The brake mechanism is shown associated with a rear wheel of the vehicle in which instance the support 7 is in the form of a disk having its hub portion 46 riveted or otherwise suitably secured to the rear axle housing 47.

From the foregoing description it will be noted that either the manually operable means or the fluid-pressure-operated means may act on the brake member to apply it to the drum and that the manually operable member forms a stop to determine the release position of the brake, and that both the manually operable means and the fluid-pressure-operated means may act conjointly to apply the brake though as a brake-applying mechanism the expander or cam member is more particularly provided for the purpose of holding the automotive vehicle on a grade if the vehicle is left standing for a considerable length of time, as under conditions with certain air brake systems the air brakes would then be in release.

I desire it to be understood that this invention is not to be limited to any specific form or arrangement of parts except in so far as such limitations are included in the claims or necessitated by the prior art.

What I claim as my invention is:

1. In brake mechanism of the character described, the combination with a rotatable brake-drum, of a brake engageable therewith, fluid-pressure-operated means carried by the brake for moving the same into braking engagement with the drum, manually-operable means associated with the brake for moving it into braking engagement with the drum, and means to release said brake from the drum.

2. In brake mechanism of the character described, the combination with a rotatable brake-drum, of a brake having portions movable into engagement with the drum, a manually-operable expander for moving said portions into braking engagement with the drum, a fluid-pressure-operated motor carried by said portions for moving said portions into engagement with the drum, said expander forming a stop to limit the release position of the movable portions of said brake, and means to release said movable portions of said brake.

In testimony whereof, I affix my signature.

NIELS A. CHRISTENSEN.